No. 614,089. Patented Nov. 15, 1898.
J. COLEMAN.
COMBINED EDGER AND TRIMMER.
(Application filed Jan. 21, 1898.)
(No Model.) 2 Sheets—Sheet 1.
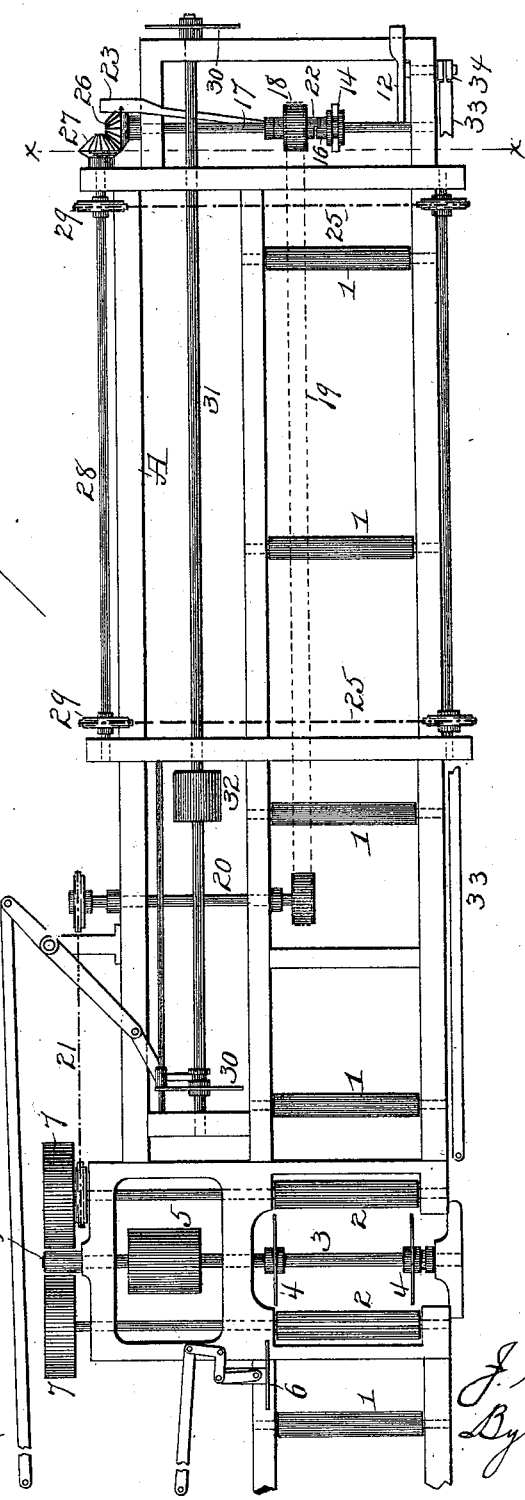

No. 614,089. Patented Nov. 15, 1898.
J. COLEMAN.
COMBINED EDGER AND TRIMMER.
(Application filed Jan. 21, 1898.)
(No Model.) 2 Sheets—Sheet 2.
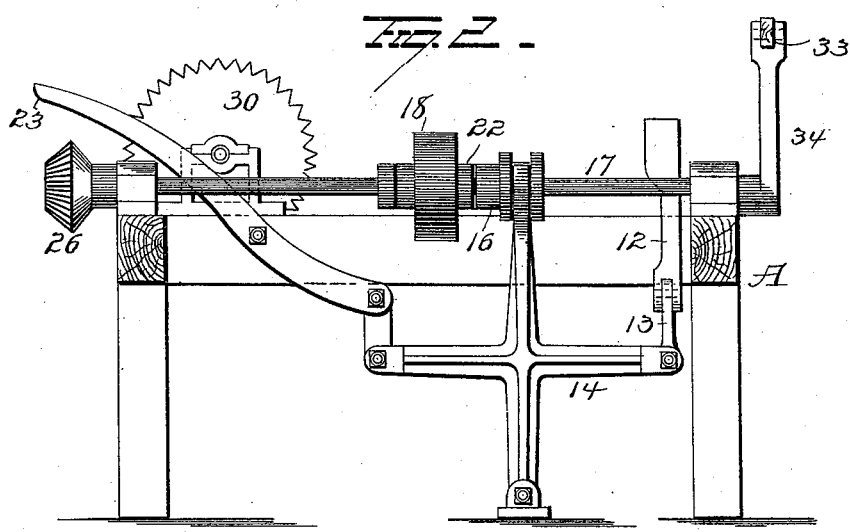
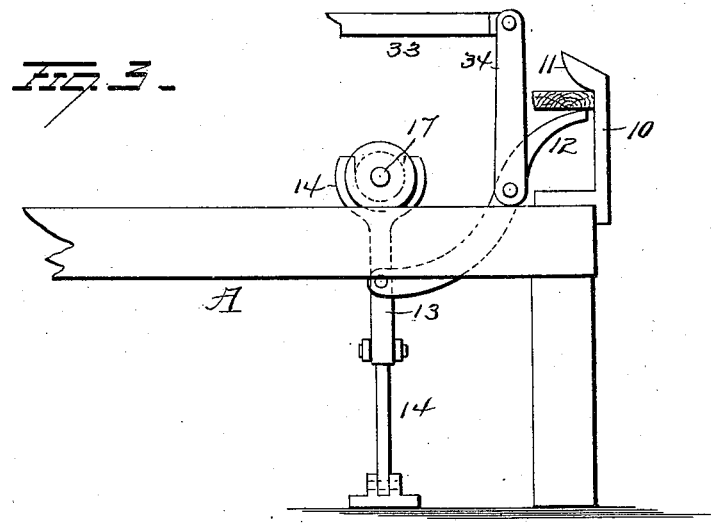
WITNESSES
E. J. Nottingham
G. F. Downing
INVENTOR
J. Coleman
By H. A. Seymour
Attorney
THE NORRIS PETERS CO., PHOTO-LITHO., WASHINGTON, D. C.

UNITED STATES PATENT OFFICE.

JOHN COLEMAN, OF WILLIAMSPORT, PENNSYLVANIA.

COMBINED EDGER AND TRIMMER.

SPECIFICATION forming part of Letters Patent No. 614,089, dated November 15, 1898.

Application filed January 21, 1898. Serial No. 667,419. (No model.)

*To all whom it may concern:*

Be it known that I, JOHN COLEMAN, of Williamsport, in the county of Lycoming and State of Pennsylvania, have invented certain new and useful Improvements in a Combined Edger and Trimmer; and I do hereby declare the following to be a full, clear, and exact description of the invention, such as will enable others skilled in the art to which it appertains to make and use the same.

My invention relates to an improvement in a combined edger and trimmer, the object being to provide a machine in which a board may be edged and trimmed in a single passage through the machine; and it consists in means for shifting the direction of a board at a predetermined time, in connection with mechanism for stopping and starting that portion of the machine automatically or otherwise which carries the board past the trimmers.

It further consists in intermittingly-propelled endless carriers which take the board after it has been edged between the trimmers, after which it is stopped and again started when the next board is ready to be trimmed.

It still further consists in certain novel features of construction and combinations of parts, which will be hereinafter described, and pointed out in the claims.

In the accompanying drawings, Figure 1 is a plan view. Fig. 2 is a section on line $x$ $x$ of Fig. 1, and Fig. 3 is an elevation of a portion of the machine at one end.

A represents the frame of the machine. In the main this machine may be divided into its two essential elements, which are known commercially as an "edger" and a "trimmer," and while the parts of the present apparatus comprise these two well-known machines yet the gist of the invention resides in an organization and adaptation of other elements with these well-known and ordinarily distinct machines, to the end that the two are made one to all intents and purposes, and the arrangement is such that when one part of the machine completes its work another performs its function. The two machines are so closely related that when the board has passed through one machine it is in the other, so that time is saved in the treatment of each board and greater economy is attained because less handling is necessary.

In the main sills of the machine the usual dead-rollers 1 1 1 are journaled, and over them the board is conveyed endwise, the feed-rollers 2 2 forcing the board positively forward through the machine. Shaft 3 is journaled in the frame, preferably between the feed-rollers, and on this shaft the edging-saws 4 4 are keyed or otherwise secured. This shaft 3 may be driven in any convenient manner, as through the belt-pulley 5, from a motor, counter-shaft, or other source of power. The spindles on which the feed-rollers 2 2 are secured are also provided with belt-pulleys 7 7, and a belt (not shown) passed around these pulleys and in contact with a pulley 8 on shaft 3 communicates motion from the latter to the feed-rollers. An adjustable gage 6 is provided for regulating the position of the board relative to the edgers 4 4. So much, then, for the edger portion of the machine.

Referring now to the trimmer portion, it is provided with a stop 10, which limits the movement of the board. This stop preferably has an inwardly-projecting inclined end 11, which forms a guide should the board be a trifle thicker or higher than the more uniform boards. As a means for automatic operation I provide a pivoted trip 12, which is arranged to coöperate with the guide on the stop to receive the end of a board between them, the trip being rounded or converged with relation to the guide for this purpose, so that when a board is thrust between them the trip is depressed and the parts now to be described are thereby set in motion. This trip is connected by means of a link 13 with the X-shaped shipper 14, pivoted to the frame. The upper end of this shipper is connected with the clutch-section 16, which latter is feathered on the shaft 17, whereby it may slide but cannot turn thereon. Loose on the shaft 17 is a belt-pulley 18, which is driven constantly through a belt 19 from an intermediate shaft 20 and the latter through sprocket-chain 21 from one of the feed-roller spindles. While this arrangement is convenient, it is not at all necessary and might easily be modified. The pulley 18 has a clutch-section 22 formed thereon, which coacts with section 16, it being locked to or unlocked from the shaft by said section 16, the former by the movement of the trip from its normal position, which swings the shipper in the direction indicated by the arrow, and the unlocking is done by the lever 23, which is connected at one end to the shipper 14, while the other or free end is in position to be traversed and depressed by the board in leaving the machine, which action has the effect of moving the shipper in the opposite direction and unclutching the shaft. The object of this clutching and unclutching is to impart an intermittent feed to the carrier-chains 25 25, which take the board from the rollers 1 1 1, when they reach the stop 10, in a lateral direction. This motion is communicated to the chains through the bevel-gears 26 and 27 to a shaft 28, which has sprocket-wheels 29 29 thereon, which carry and drive the carrier-chains 25 25.

As the board is conducted laterally through the machine the ends of the board come simultaneously in contact with the two trimmer-saws 30 30 on shaft 31 and are thereby trimmed. One of the trimmers may be shifted on the shaft 31, as shown, by means of suitable lever mechanism for the purpose to trim the boards to the desired length. The shaft 31 may be driven in any convenient way—as, for instance, through belt-pulley 32. As an alternative construction in lieu of the automatic means for starting and stopping the carrier-chains a hand or foot lever may be connected to the rod 33, which is pivotally connected with an arm 34 on the shaft on which the trip is mounted. Thus it will be seen that while the motion of the edger is continuous the movement of the trimmer is intermittent, and may be made so automatically or otherwise, this provision being necessary to the successful working of a combined trimmer and edger unless at least additional and much more complicated mechanism is resorted to, which it is my purpose to avoid.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with two sets of saws arranged at right angles to each other, feed mechanisms for the respective sets of saws and driving means for said feed mechanisms, of a trip device connected with said driving means and adapted to be operated automatically by the lumber moved by the first feed mechanism whereby to set the second feed mechanism in motion to transfer lumber laterally from the first feeding mechanism, and an independent trip also connected with the driving means and adapted to be operated automatically by the lumber during its lateral movement, whereby to stop the second feed mechanism, substantially as set forth.

2. The combination with edging-saws, continuously-operating feed mechanism therefor, trimming-saws and lateral feed mechanism therefor, of driving means for said feed mechanisms, a trip in the path of lumber on the continuous feed mechanism and connected with the driving means whereby to automatically set the lateral feed mechanism in motion and an independent trip connected with the driving means and terminating in the path of the lumber on the lateral feed mechanism whereby to automatically stop the operation of the latter, substantially as set forth.

3. In a combined edger and trimmer, the combination with edging-saws, feed mechanism therefor, trimming-saws and feed mechanism constructed to convey lumber laterally from the first-mentioned feeding mechanism to the trimming-saws, of gearing connected with said feed mechanisms, a clutch connected with that portion of the gearing which actuates the trimming-saws feed mechanism, a shipper connected with said clutch, an arm disposed in the path of a board moved by the edging-saws feed mechanism, said arm connected with said shipper whereby to effect the closing of the clutch and the operation of the trimming-saws feed mechanism and a second arm connected with said shipper and disposed in the path of a board moved by the trimming-saws feed mechanism, whereby to automatically effect the opening of the clutch after a board has been trimmed, substantially as set forth.

4. The combination with suitable framework, of edging-saws, trimming-saws, feed mechanism for the latter, driving means for said feed mechanism, a clutch connected with said driving means and having its sections normally out of mesh, an angular pivoted shipper-lever connected with said clutch, feed mechanism coöperating with the edging-saws and constructed to deliver lumber to the first-mentioned feed mechanism, and a curved trip-arm connected with the shipper-lever and terminating in the path of movement of lumber moved forward by the edging-saws feeding mechanism, substantially as set forth.

5. The combination with suitable framework, of edging-saws, feed mechanism therefor, trimming-saws and feed mechanism therefor, driving means for said feed mechanisms, a stop to receive lumber from the first-mentioned feed mechanism, said stop having an arm with a curved face, a clutch connected with the driving means of the trimming-saws feed mechanism, a shipper connected with said clutch and a trip-arm connected with said shipper and terminating in proximity to the curved face of said stop, substantially as set forth.

In testimony whereof I have signed this specification in the presence of two subscribing witnesses.

JOHN COLEMAN.

Witnesses:
 FRANK E. ECK,
 H. T. KREAMER.